(No Model.)  2 Sheets—Sheet 1.

R. G. JENCKES.
HOMINY MILL.

No. 522,468. Patented July 3, 1894.

WITNESSES:
E. E. Duffy
C. M. Werle

INVENTOR
Ray. G. Jenckes
BY O. E. Duffy
ATTORNEY.

(No Model.) 2 Sheets—Sheet 2.

R. G. JENCKES.
HOMINY MILL.

No. 522,468. Patented July 3, 1894.

WITNESSES:
E. C. Duffy
Hubert E. Peck

INVENTOR
Ray G. Jenckes
BY O. E. Duffy
ATTORNEY

UNITED STATES PATENT OFFICE.

RAY G. JENCKES, OF TERRE HAUTE, INDIANA.

HOMINY-MILL.

SPECIFICATION forming part of Letters Patent No. 522,468, dated July 3, 1894.

Application filed March 8, 1894. Serial No. 502,860. (No model.)

*To all whom it may concern:*

Be it known that I, RAY G. JENCKES, of Terre Haute, in the county of Vigo and State of Indiana, have invented certain new and useful Improvements in Hominy-Mills; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in hominy mills.

The object of the invention is to provide an improved mill whereby corn can be quickly, easily and economically treated so as to produce the product known as hominy.

A further object of the invention is to provide certain improvements in details of construction and arrangements and combinations of parts whereby a greatly improved and efficient hominy mill will be produced.

The invention consists in certain novel features of construction and in combinations and arrangements of parts more fully and particularly set forth and described hereinafter.

Figure 1:
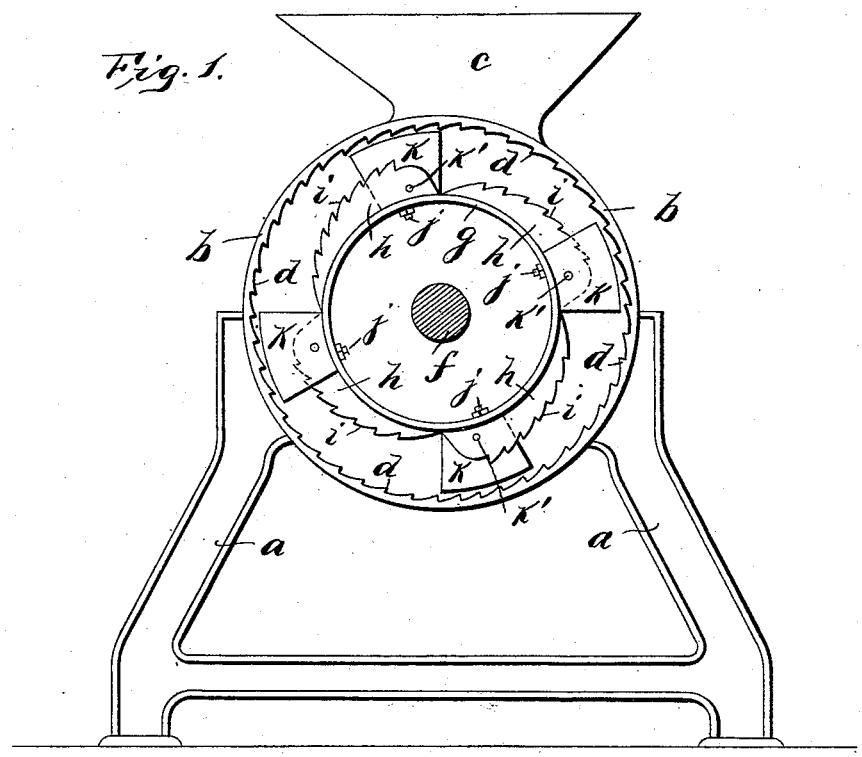
Figure 2:
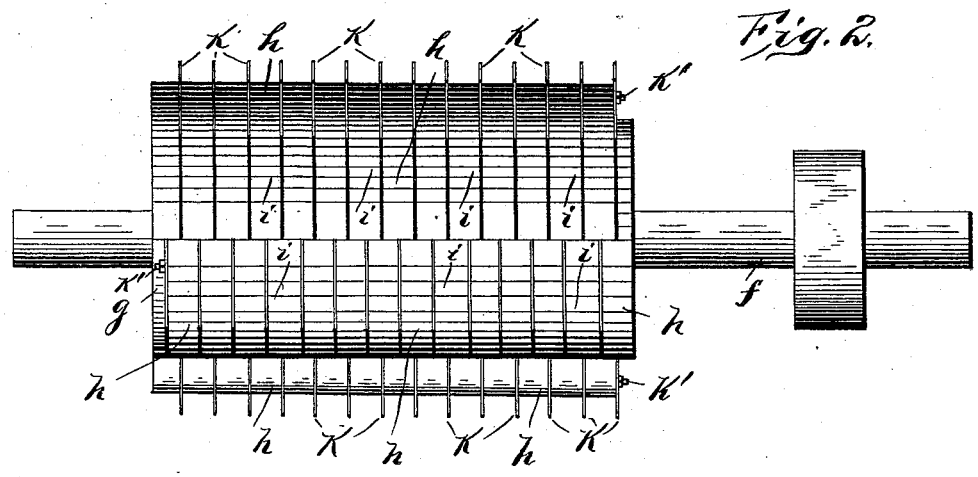
Figure 3:
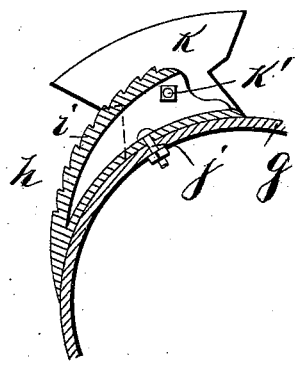
Figure 5:
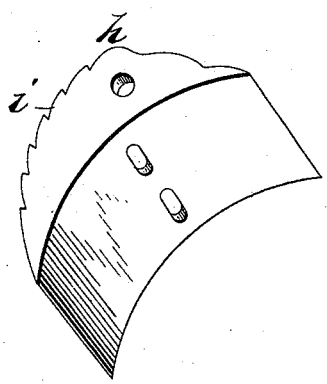
Figure 6:
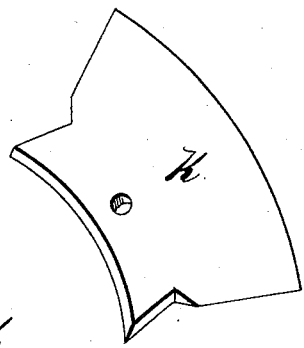
Figure 4:
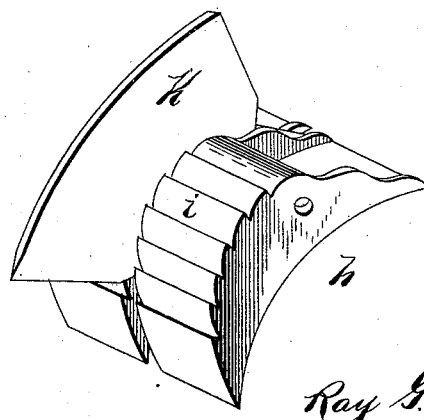

Referring to the accompanying drawings:—Figure 1 is a cross section through the mill. Fig. 2 is a detail elevation of the rotary cylinder. Fig. 3 is a detail sectional view through a portion of the cylinder and longitudinally of one of the corrugated lugs, showing one of the knives in elevation. Fig. 4 is a detail perspective view showing the lugs with the knife clamped between them. Figs. 5 and 6 are respectively detail perspective views of a lug and a knife.

In the drawings $a$, is a suitable supporting frame constructed in any desirable and suitable manner and form.

$b$, is the cylindrical casing of the mill shown horizontally arranged, and provided with a feed hopper $c$, on the upper side thereof. This casing is hollow and is provided with suitable means (not shown) whereby the inflow of corn through the hopper can be controlled and whereby the hominy produced and the shell or hull removed from the corn can be easily removed from the casing. The inner surface of the casing is provided with longitudinal teeth, or corrugations $d$, arranged completely around the inner surface thereof. These teeth or corrugations are preferably inclined in a direction opposite to that in which the rotary portions of the mill revolve. These corrugations can be formed in any suitable manner directly on the inner surface of the casing or in sections and secured thereon or in any other suitable and desirable manner.

$f$, is the drive shaft suitably driven and mounted in the frame and passing longitudinally and concentrically through the casing. Concentrically within the casing the shaft is preferably enlarged or provided with the drum or cylinder $g$, rigid therewith. This rotary cylinder is provided with suitable abrasing or rubbing means to coact with the inner rubbing surface of the casing and to press the corn outwardly against the casing so that the outer shell or skin of the corn will be rubbed off, and also with radial knives to properly cut the corn to produce the product hominy.

$h$, is a block or lug preferably cast integral and hollow with the inner surface or wall rounded to conform to the outer surface of the cylinder, and having straight side walls, and the outer transversely toothed or corrugated wall $i$, from the front end of the inner wall and curving outwardly and toward the opposite end of the block or lug so that the lug gradually increases in thickness or tapers from its front end rearwardly substantially as shown. The floor or inner wall of the lug is preferably provided with slots or openings to receive the bolts $j$, securing the block on the rotary cylinder. The rear end of the block is preferably open so that the securing bolts extending within the cylinder can be easily operated and the nuts thereon tightened. These blocks or lugs are secured on the rotary cylinder usually in rows extending longitudinally of the cylinder. The drawings show fourteen blocks or lugs in a row and four rows, each lug being secured on the cylinder transversely to the axis thereof and with its small end in the direction of rotation. The teeth of the block preferably incline rearwardly if inclined teeth are provided, so as to have rubbing action.

The knives *k* are clamped between the blocks or lugs so that each row of blocks shown in the drawings has fourteen knives and lugs of the various rows are arranged preferably so that they will not be in the same transverse planes and hence will not "track." Each knife usually consists of a flat steel blade having sharp end edges extending radially outwardly so as to just clear the inner corrugated surface of the mill casing. The inner edge of each knife is concaved to fit the outer surface of the cylinder and each knife has a transverse bolt hole so that each knife can be clamped in position by a bolt *k'* passed through openings in the adjoining side walls of the adjacent blocks and through the blade.

When the casing has received the proper quantity of corn and the cylinder is rapidly revolved the shape of the blocks or lugs is such that the corn is pressed or thrown outwardly against the roughened inner surface of the casing, and the kernels of corn are rubbed against each other and rubbed and wedged and scoured against the roughened surface of the casing and lugs so as to remove the outer skin or shell from the corn. The knives passing through the mass of corn cut the corn to the required shape to produce the hominy.

The action is very quick and thorough because of the corrugated surfaces and by reason of the peculiar shape of each lug.

It is evident that this invention is not limited to any peculiar number of knives or corrugated blocks, and that various changes might be made in the forms, constructions and arrangements of parts described without departing from the spirit and scope of my invention, hence I do not wish to limit myself to the exact construction herein set forth.

What I claim is—

1. In a hominy mill, the combination of the casing interiorly corrugated, and the rotary cylinder therein having rearwardly and outwardly inclined corrugated surfaces thereon arranged to force the corn outwardly and coact with said casing inner surface to scour the same, and knives carried by said cylinders, substantially as described.

2. A hominy mill having its rotary member provided with closely arranged series of blocks secured thereon, each block cast hollow and integral with straight side walls, the concaved inner wall, the open rear end, and the outer roughened wall inclined outwardly and rearwardly, substantially as described.

3. The rotary member of a hominy mill having the closely arranged blocks secured thereon and provided with outer inclined scouring or rubbing surfaces, and the knives clamped between the blocks, substantially as described.

4. The combination of an outer casing with the rotary shaft within the same, the rows of closely arranged rubbing or scouring blocks secured thereto, and the radial knives, each knife clamped between a pair of blocks by a bolt passed through the knife and adjoining walls of the block.

In testimony that I claim the foregoing as my own I affix my signature in presence of two witnesses.

RAY G. JENCKES.

Witnesses:
J. H. GENNUG,
W. D. MARKLE.